B. L. RYDER.
Potting and Packing Plants.
No. 84,002.
Patented Nov. 10, 1868.
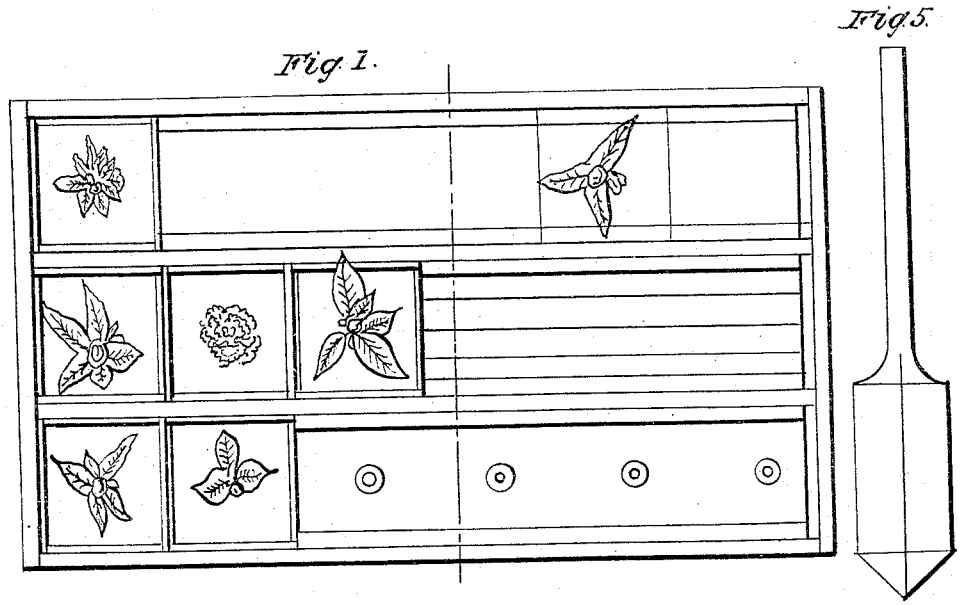
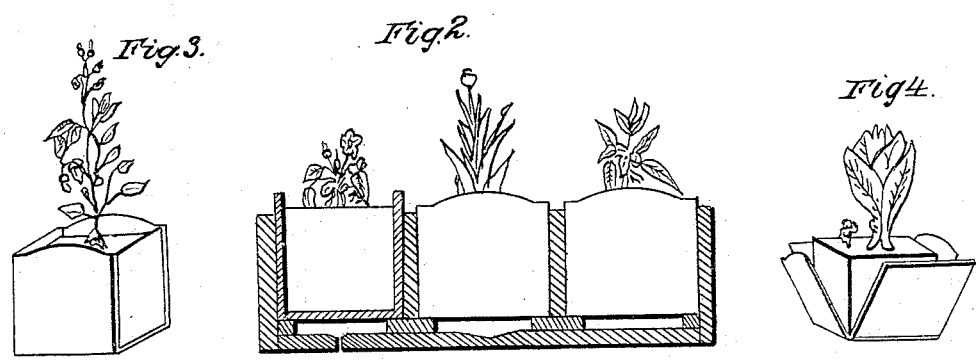
Witnesses
Adolphus Rock
Thos. A. Connolly
Inventor
Benjamin L. Ryder
by Daniel Breed
Atty.

BENJAMIN L. RYDER, OF CHAMBERSBURG, PENNSYLVANIA.

Letters Patent No. 84,002, dated November 10, 1868.

IMPROVEMENT IN POTTING AND PACKING PLANTS.

The Schedule referred to in these Letters Patent and making part of the same.

*To all whom it may concern:*

Be it known that I, BENJAMIN L. RYDER, of Chambersburg, in the county of Franklin, and State of Pennsylvania, have invented a new and useful Improvement in Potting and Packing Plants; and I do hereby declare that the following is a full and exact description thereof, reference being had to the accompanying drawings, and to the letters of reference marked thereon.

In the accompanying drawings—

Figure 1 is a crate, with some plants set into the same.

Figure 2 is a transverse section of the crate, containing some plants in boxes, also showing the drainage.

Figure 3 is a box and plant separate from the crate.

Figure 4 shows a potted plant, with the box partly removed.

My invention consists of a new and useful method of potting and packing plants with rectangular masses of earth about the roots.

Instead of using the common pots, which are heavy and inconvenient to pack, I pot the plants in small square or rectangular boxes, as shown in the drawings. These boxes may be made of veneers, straw-board, or other suitable thin material. After the roots of the plant have interwoven through the mass of earth, the box may be opened, as seen in fig. 4, and the mass of earth taken from the box and set into the crate or large box, (fig. 1.) As these square or rectangular masses of earth pack close against each other, there is no need of straw or other similar material in packing. If desired, the boxes themselves may be set into the crate, as the bulk and weight of such boxes are a trifle in comparison to the common pots.

The boxes may be made from flats, scored to facilitate the handling at the lower edge of the box.

In setting out plants thus grown, I prefer to use a plug or dibble, fig. 5, with which a suitable hole may be made, and the mass of earth inserted with the plant. The point of the dibble will make a hole which will facilitate drainage, and afford a water-reservoir to serve the plant. A metallic shield may be put upon the dibble, and also a shoulder or step for the foot, in thrusting the dibble into the ground. For the crate herein described, I propose to make a separate application for a patent.

I am aware that loose, ventilated veneer boxes are in use for fruit, but such boxes will not answer my purpose, which requires a close-jointed box, as seen in the drawings.

Having thus fully described my invention,

What I claim, and desire to secure by Letters Patent of the United States, is—

The above-described mode of potting and packing plants with rectangular masses of earth about the roots, such masses fitting closely against each other, and against the sides of the crate or large box in packing, substantially in the manner and for the purposes set forth.

Also, the above-described close-jointed sectional box, or its equivalent, for the purpose of forming the rectangular masses of earth, and for potting and packing plants, substantially in the manner above described.

BENJAMIN L. RYDER.

Witnesses:
   W. G. REED,
   ENOS B. ENGLE.

*Ass'or to the Ryder Nursery Association.*